(12) United States Patent
Lewak

(10) Patent No.: US 6,856,318 B1
(45) Date of Patent: Feb. 15, 2005

(54) METHOD OF PRESENTING AND TEACHING ABSTRACT CONCEPTS BY ANIMATING ABSTRACT SYMBOLS

(76) Inventor: Jerzy Lewak, 107 S. Cedros Ave., Solana Beach, CA (US) 92075

( * ) Notice: Subject to any disclaimer, the term of this patent is extended or adjusted under 35 U.S.C. 154(b) by 0 days.

(21) Appl. No.: 09/160,728

(22) Filed: Sep. 25, 1998

Related U.S. Application Data

(60) Provisional application No. 60/059,955, filed on Sep. 25, 1997.

(51) Int. Cl.[7] ............................................. G06T 13/00
(52) U.S. Cl. ...................... 345/473; 434/118; 434/188; 434/191; 434/209
(58) Field of Search .......................... 345/473; 434/118, 434/188, 191, 209, 185, 167, 169, 307 R; 704/235, 276

(56) References Cited

U.S. PATENT DOCUMENTS

| | | | |
|---|---|---|---|
| 4,884,972 A | * 12/1989 | Gasper | 434/185 |
| 5,535,421 A | * 7/1996 | Weinreich | 395/887 |
| 5,732,001 A | * 3/1998 | Nakayama et al. | 364/710.03 |

FOREIGN PATENT DOCUMENTS

| | | | | |
|---|---|---|---|---|
| GB | 2 127 200 A | * | 9/1982 | G09B/19/02 |

OTHER PUBLICATIONS

Foley et al., Computer Graphics: Principles and Practice Second Edition in C, pp. 1058–1060.*

* cited by examiner

*Primary Examiner*—Mark Zimmerman
*Assistant Examiner*—Lance W. Sealey
(74) *Attorney, Agent, or Firm*—Jaquez & Associates; Martin J. Jaquez, Esq.; William C. Boling, Esq.

(57) ABSTRACT

Methods of dynamically presenting transformations of expressions comprising symbols representing abstract concepts are described. Methods are presented of animating these symbols to exhibit the transformations and, optionally, link these animations with the corresponding animations of a concrete pictorial model. Additional methods are described linking these animations with computer controlled and,even computer calculated explanations of the process in both text and sound.

The purpose is to present the rules for transforming abstract representations (for example equations) in ways that are much easier to understand and remember. Such animations are the modern dynamic "illustrations" of these transformations.

Methods are described of computer controlled sequencing of the animations with corresponding animations of a concrete analogical model.

18 Claims, 1 Drawing Sheet

$$3(2x-4)-3x=-6x-5$$

$$\xleftarrow{3}(2x-4)-3x=-6x-5$$

$$(\overset{3}{\downarrow}\ 2x\overset{3}{\downarrow}\ 4)-3x=-6x-5$$

$$(\overset{3}{\downarrow}\ 2x\overset{3}{\downarrow}\ 4)-3x=-6x-5$$

$$(3*2x-3*4)-3x=-6x-5$$

$$3*2x-3*4-3x=-6x-5$$

(a)  $\overset{\uparrow}{3}(2x-4)-3x=-6x-5$ (b)  $\overset{3}{\leftarrow}(2x-4)-3x=-6x-5$ (c)  $(\overset{3}{\downarrow}2x\overset{3}{\downarrow}\ 4)-3x=-6x-5$ (d)  $(\overset{3}{\downarrow}2x\overset{3}{\downarrow}\ 4)-3x=-6x-5$ (e)  $(3*2x-3*4)-3x=-6x-5$ (f)  $3*2x-3*4-3x=-6x-5$

Figure 1

METHOD OF PRESENTING AND TEACHING ABSTRACT CONCEPTS BY ANIMATING ABSTRACT SYMBOLS

This application claims priority under 35 USC 119 to U.S. Provisional Application No. 60/059,955 filed Sep. 25, 1997 and entitled "Method of Presenting & Teaching Abstract Concepts by Animating Abstract Symbols Using Computer Voice Explanations & (Optionally) Synchronized Animated Concrete Pictorial Models" the contents of which are hereby incorporated in their entirety by reference.

BACKGROUND OF THE INVENTION

Many subjects require the teaching of abstractions. Often these abstractions are represented using specialized symbols. From the simplest beginnings of arithmetic, where numbers and letters are the abstract symbols we use, to the most advanced mathematics, such symbols pervade our culture. The letters of the alphabet are the first symbols we learn, and are the building blocks of our written language.

In the process of teaching various subjects, these symbols are used to create meaningful expressions. These expressions are often transformed into other expressions, for simplification or illustration purposes, according to some rules. In the subject of mathematics, a linear algebraic equation with one unknown is an example of a symbolic expression, and the steps needed for its solution are the symbolic transformations of the original equation.

Chemical formulas are another example of symbolic representations, where the transformations may represent chemical reactions, ionic dissociations, or changes of crystal structure, many of which can be illustrated with more concrete diagrammatic models.

The transformations of words in linguistics are the declensions of nouns, conjugations of verbs, changes of characters within words to correct spelling, and changes of word order in sentences to change meaning or illustrate different meanings. These in turn can be illustrated with the linguistic meaning of each.

Although many software programs have been developed to help in the instruction of such subjects, they all present the transformations in discrete steps. The actual transformations have to be inferred from the starting expression followed by the transformed, ending one. Such inference is sometimes difficult for some people to make and requires a visualization of the continuous process.

For example, the conventional method of illustrating how a mathematical expression is transformed, is to display each step, in a step-by-step process, leaving the previous expression displayed, so the viewer can compare it with the current one and thus deduce the details of the transformation. Unfortunately, many viewers find it difficult to make that deduction, even when this is explained, and this frustrates their understanding.

When a human presenter, as opposed to a computer program, makes presentations, he or she will often point to various parts of the expression while explaining the transformation process. Additionally, a human presenter can be asked questions if the presentation is not clear.

By highlighting and animating, in a continuous fashion, the transformation of an expression, a computer program can improve on, and also enhance, human presentations of such abstract material. Animations will have the additional advantage of helping pictorially oriented users to visualize the transformation rules and thus aid in their memorization and understanding.

Any tool which helps visualize and make concrete the abstract rules governing expression transformations, will also be useful in presentations, both in education and in other professional situations.

Simple concrete model analogies of abstract representations are sometimes used in textbooks. When such models can be dynamically tied to the abstract expressions, the result can be a very powerful concrete dynamic model of the underlying abstract system. Transformations of the symbolic representations are immediately reflected as concrete changes in the pictorial concrete model, making the rules governing these transformations intuitive and almost obvious.

RELATED ART

Very limited animation of equations has been used in a series of 27 videos for college student education, under the support of the Anenberg Foundation, named "The Mechanical Universe and Beyond." The very brief occasional animation used in these movies is for esthetic effects only. They do not attempt to use the animations to teach the underlying rules of the transformation, but rather assume that the viewer is familiar with these rules.

No other uses of animation of symbols in teaching are believed to exist.

As an example of the application of this invention, we describe here in detail a software implementation of equation animation and the connected model balance, in the context of teaching linear equation solving.

EXAMPLES

Many different applications of such animation of symbols are possible in the context of teaching different subject domains, such as math, chemistry, biology, physics, linguistics, and all branches of engineering or computer science. The precise code implementations are not crucial to the animation process and are well known in the art. They are also illustrated in the source code appendixes of this document. Other methods of displaying the animation, such as projecting movies of the animation, are also envisioned.

Non-instructional applications of the invention are also likely. For example, display of animated transformations of chemical formulas, biological or engineering structures could be very helpful in exhibiting research results. Such animation features could therefore become a part of standard presentation tools.

Algebraic Example of Symbolic Animation.

We illustrate the animation needed in presenting the step-by-step solution for x, of the following linear equation: $3(2x-4)-3x=6x-5$ The first step is the removal of the parentheses and the multiplying through by the factor 3. One way to animate this is as follows (see FIG. 1):

1. first highlight in some way (for example, by flashing or "rolling" from top to bottom or drawing an arrow pointing to it)) the factor 3, which is about to be animated,
2. move the factor 3 vertically to above the line of the equation,
3. move the left parenthesis to the left while moving terms to make room in front of both parenthesized terms, moving the term 4 to leave room between the minus sign and 4,
4. duplicate the factor 3 moving the copy to the right horizontally, 5 move the original 3 down, in front of the 2x term, introducing the multiplication factor between them to give 3*2x (movement indicated by dashed arrows in FIG. 1), 6 move the copy of 3 to the right, above and in front of the term 4, 7 move the factor 3 down into the space made between the minus sign and the digit and add the multiply "*" to give −3*4, 8 remove both parentheses, 9 Steps 4 through 7 may be performed simultaneously.

The resulting equation, after the above animation becomes:

$$3*2x-3*4-3x=-6x-5$$

In the next step evaluate the products. The animation here proceeds in the following steps:

1 highlight the product 3*2 as before to indicate that it is to be transformed, 2 move the product 3*2 above the equation line, 3 draw an arrow down from this product to the location in front of x, 4 draw the result of the product, in this case 6, in front of x, 5 remove the product 3*2 and the arrow to complete the animation In the next step do a similar animation of the 3*4 product. After that the resulting equation is:

$$6x-12-3x=-6x-5$$

In the next step re-arrange the terms so as to bring the term 6x next to the term −3x. The animation proceeds as follows:

1 highlight the term −3x, as before, to indicate that it is to be transformed, 2 move the term −3x above the equation line, 3 move the term −12 to the right to make room for the −3x to come down from above, 4 move the term −3x down from the line above to the equation line, completing the swap of positions.

An alternative animation procedure would simply move horizontally the two terms through each other swapping their position. The resulting equation is:

$$6x-3x-12=-6x-5$$

The next step is to combine the terms 6x−3x into one term 3x. The following animates this step:

1 continuously draw parentheses around the expression (6x−3x), 2 highlight the two instances of x in the expression, to indicate that they will be moved, 3 move both instances of "x" one from each term, above the equation line and then both towards the right of the expression stopping just above and to the right of the closing parenthesis, 4 merge the two instances of x into one instance, 5 move the remaining instance of x to the line of the equation, next to the closing parenthesis, resulting in the expression (6−3)x, 6 highlight the combination 6−3 to indicate that it is to be transformed, 7 move the combination 6−3 above the equation line, 8 remove the parentheses, 9 draw a curved (or straight) arrow from the 6−3 to the position just in front of x, 10 draw the result 3 in that position, 11 remove the 6−3 from above the equation line, completing the animation.

The resulting equation becomes:

$$3x-12=-6x-5$$

The next step requires either the addition of 6x to both sides (the more elementary step) or the equivalent rule based step, the moving of −6x from the right to the left hand side of the equation as +6x. The animation of the latter proceeds as follows:

1 highlight the −6x term to indicate that it is to be moved, 2 move the −6x term up above the equation line, 3 move it to the left horizontally, changing its sign at the exact time it crosses above the equals sign, 4 move the 3x term to the left, making room for the +6x, 5 move the +6x term down to the space prepared for it between the 3x and the −12, 6 close up any gaps left behind.

The resulting equation is: 3x+6x−12=−5. The next step is the combining of 3x+6x to 9x. Such an animation has already been described. The resulting equation is 9x−12=−5.

The next step is to move the term −12 to the right side of the equation.

Animation follows similarly to that just described:

1 move the term above the line, 2 then across to the right, switching its sign as it crosses above the equals sign, 3 then down to take its place on the right of the equation.

The resulting equation is 9x=12−5.

Animation of the addition has been described, giving 9x=7. Now all that is remains is the animation of the transformation to the result: x=7/9.

This animation proceeds as follows:

1 move the factor 9 to the right of the term 5, 2 draw the divide "/" symbol between the two numbers. (Alternatively, when fractions do not have the single line form, the factor 9 would move to the denominator on the right of the equation.)

This completes the illustration of symbolic animation in the context of linear equation solving.

The preferred embodiment of this display process is in the form of software. There are many currently well known and implemented methods for software animation of pictures. Animation of symbols can be achieved by substituting the symbols for the pictures.

The details of the animation can change from instance to instance, but the principle of animating symbolic representations, in order to make transformations clear, is the basis of the present invention. For a clear presentation, the following rules should be followed:

1 Before beginning to animate a symbolic transformation, highlight the symbol to be changed. This highlighting should preferably be dynamic, that is time changing (such as flashing the symbol several times) rather than static (such as inverting the symbol and leaving it inverted).

2 When the transformation involves the moving of a symbol, this motion should be as continuous as possible. Re-drawing the symbol at more intermediate places is the well known method of achieving continuous motion. During the motion, the symbol may need to be changed in some way. The change should also be as continuous as possible and should, wherever possible, be related logically to its position.

3 When the transformation involves the removal of symbols, this removal should be performed continuously, rather than abruptly. There are two ways to remove a drawing continuously: fading it out and "undrawing" it. Fading is usually achieved on a computer screen by deleting every other dot recursively. Undrawing is more appropriate to line drawings where each line is removed continuously, linearly, in reverse order of the original drawing.

4 When removal of symbols is governed by some rules, these rules should be followed in the animation. So for example, the removal of a parentheses pair could be animated by moving the pair together and as they are merged, they both disappear, in a simulated "mutual annihilation" process. As another example, when both sides of an algebraic equation have just one term each, and both terms have negative signs in front of them, changing both signs can be animated by moving each sign up, above the equation, then towards each other where, as they merge, they annihilate each other.

5 For presentations meant for younger children, the symbolic animations should be integrated into game-like scenes. For example, each symbol could be given a personality and the rules of the transformations integrated into the behavior rules of these personalities.

Keeping each animation continuous makes sure that the viewer is less likely to miss the details of the change being presented. Any small lapse of attention can easily cause the viewer to miss a sudden change, but this is less likely when the change is gradual and smooth.

Animating while illustrating rules of transformations, allows viewers to keep a mental picture of the abstract rules, thus aiding in their memorization. This animation is the dynamic generalization of the static illustration.

There are many ways such animations can be implemented. In the preferred embodiment, the display is on a computer screen and the implementation is in the form of software.

In the preferred embodiment, the symbolic expressions are displayed on a computer screen and their animation typically comprises the following steps:

1 Draw the expression in its starting state.
2 Determine which symbols will take part in the animation.
3 Determine the nature of the animation (that is: moving of symbols, removing of symbols, duplicating symbols or adding new symbols).
4 Determine the path of any symbols to be moved.
5 Determine the speed of motion of any symbols to be moved.
6 Highlight the symbol to be moved, bringing the viewer's attention to it.
7 Erase the symbol to be moved and re-draw it in the next incremental position. Repeat this until the final position of the symbol is reached.
8 Erase any symbol to be removed and draw any symbol to be added.
9 When a duplicate needs to be created, create a copy of the original in the same location and then move that copy smoothly from that location to next location.

The means of performing all these steps are well known in the art and will not be described.

The Connected Balance Model

A simple model of an equation is a balance. The unknown is an unknown weight. The left-hand-side of the equation represents the weights in the left pan of the balance, the right-hand-side of the equation, the contents of the right pan of the balance. The fact that the total of the weights in each pan are the same, means that the balance is in balance and that the equality of the equation is satisfied. The process of transformation of the equation needed to solve for the unknown is equivalent to the weighing of the unknown weight.

The objective is to isolate the unknown in the left pan and the known weights in the right pan, while maintaining balance, so that the unknown weight is determined.

These concrete operations on the balance are tied to their symbolic analogues in the equation, so that as the operations are performed (either through animation or through user input) on the balance model, the corresponding transformations are immediately reflected in the symbolic representation of the equation. Similarly, if the symbolic transformation is performed on the equation through user input, the connected balance model would be animated to reflect the analogous change. (See example below.)

Such a balance model is easiest to apply to a simple equation with only positive terms and positive solutions. Negative numbers need to be represented by negative weights and so are not as immediate to one's experience. Negative weights can be modeled either with balloons filled to lift the corresponding weight and attached to the pan, or with weights over pulleys transferring the downward pull of the weight to an equal upward pull on the string passing over the pulley. An alternative, though more complicated model for negative numbers could be liquid immersed objects rigidly attached to the underside of a pan, exerting an upward push equal to the weight needed to just sink the object (the ballast). The preferred embodiment is in the form of balloons.

All the steps (rules) of the symbolic transformations of the equation needed to solve it, are exactly modeled by the following concrete operations on the balance model:

1 adding the same weights to both pans of the balance is equivalent to adding the same positive number to both sides of the equation;
2 removing the same weights from both pans of the balance (or adding a balloon to each pan of the balance) is equivalent to subtracting the same positive number from both sides of the equation;
3 swapping the contents of each pan is equivalent to swapping the sides of the equation;
4 each weight in each pa n represents an additive positive number term to the corresponding side of the equation;
5 each balloon attached to a pan represents a negative number term on the corresponding side of the equation;
6 a specially colored and shaped "weight" labelled with the name of the unknown, in any of the pans of the balance represents the term involving the unknown on the corresponding side of the equation.

A detailed example of such a connected model and equation follows .

EXAMPLE

Suppose the equation to solve is $2x+5=9$

The balance model of that equation has the following distribution of weights:

In the left pan: two unknown weights, each labelled "x" plus five weights each labelled "1." Alternatively, one weight labelled "2x" and another labelled "5."

In the right pan: nine weights each labelled "1." Alternatively one weight labelled "9."

The balance is in balance.

The user cane now choose to either manipulate the weights or type in the next step (transformed equation) in the solution process. Manipulating the weights, the user is instructed to make sure that after each change, the balance remains in balance, keeping in mind that the objective is to isolate the unknown weight in the left pan, thus determining its value.

Suppose the user removes the five unit weights from the left pan. To keep it in balance, he/she has to remove five of the nine unit weights from the right pan also. When he/she does this, the equation reflects this through the animation process of moving the "+5" term from the left of the equation, changing its sign, and dropping it as "−5" on the right of the equation. Alternatively, the equation simply changes to the new state, namely 2x=4, without any animation.

The next step would be the removal of one-half of the contents of each pan, which is equivalent to the division by two of the weights in each pan. On the equation side, it is also equivalent to the division of each side of the equation by two. When the user acts on the balance model to make this happen, the equation is changed to reflect the new state.

If instead the user solves the equation, step-by-step, each time typing in the next transformed version of the equation, the connected balance model would, on each transformation, either animate the corresponding step as explained above, or simply change to the new state without animation.

In other words, the connected model and the symbolic expression behave as if they were connected together, so that if the user changes one, the other changes appropriately.

The connected model need only be added to the symbolic animator, as an option, at user's choice.

A game may be created using the balance model, to enable the user to learn the concrete rules corresponding to the abstract transformations, necessary to weigh the unknown, or equivalently solve the equation for the unknown. The following describes the operation and rules of one embodiment of such a game.

Game of Weighing the Unknown

The balance display allows the player to click and drag each object on either side. The display also shows several tools to help the player manipulate the weights, balloons and the unknown "question mark" weights. The "magic" transformation tool will transform each weight presented to it, to the same value balloon and each balloon presented to it, to the same value weight. Another will divide the value of the weight or balloon presented to it, by the number chosen from the whole numbers between 1 and 9. There is also a trash bin, into which any object can be thrown away, and a palette of standard whole number weights, from which new starting weights can be taken. These are all the tools needed to solve all possible equations with rational coefficients. If the player makes a mistake, he/she can ask for the last step to be reversed, but he/she looses a point if the mistake upsets the balance.

If the player tries to perform any manipulations without locking the balance, he/she is told to first lock the balance to avoid unbalancing it during the process. Each unbalance causes the player to loose points.

The game begins with the player typing in an equation or asking for an equation. Different levels of difficulty are available to be chosen by the player. When the equation is entered it becomes modeled by a distribution of weights and balloons in the two pans. That is, the balance models the equation.

The player is then invited to solve the equation by manipulating the balance using the provided tools.

Engineering Details.

Animations of symbols and graphics can be performed-in many different ways. One way is to create movies and project them. This however does not allow for very easy user interaction. So the preferred embodiment is to use a computer and to create the animation by drawing the objects on the screen in different states and positions as is known in the art. The details of this process are well known and are described in standard texts. (See for example the book "Game Programming" by McCormack, Ragnemalm, Celestin, et al. p. 2)

The explanation text and its spoken version are two aspects of this invention which have many possible implementations. Although it is possible to pre-define and record all the possible explanation texts which might be needed in a limited set of presentations of equation solving, the number of possibilities becomes quite unmanageable except for an extremely limited repertoire of presentations. The object of this invention is to enable the presentation of the solution to be possible for any user defined problem. It therefore follows that the preferred embodiment synthesizes the explanation text and then uses a text-to-speech engine to convert to speech the synthesized text in real time.

The following are the principal processes which needed careful engineering in this invention:

(a) Designing the parser for equation parsing.

(b) Designing the animator so that it was driven by the results of the parser.

(c) Synchronizing the animator with the displayed explanation text.

(d) Synchronizing the animator with the synthesized text-to-speech.

(e) Providing high-level control for adjusting the explanations and their synchronization.

(f) Providing textual control of the pointer, so that its motions can be easily synchronized with the animations and voice explanations.

The result of the above described methods, in the preferred embodiment, is a software program called TOAD (Teacher-On-A-Disk) EST which teaches, in our example, the solution of equations in one unknown, including the solution of word problems. It includes the capability for a user to input their own equation and then be tutored, step-by-step through the process of solving it, a feature that has up to now not been available in any program. The sources for TOAD are included with this patent application as a separate printing.

What is claimed is:

1. A method of illustrating transformations of abstract symbol statements, comprising:

a) presenting a first form of an abstract symbol statement on a computer-controlled display device;

b) presenting a second form of the abstract symbol statement that is a transformation of the first form;

c) animating, so as to produce an illusion of motion, portions of the first form of the abstract symbol statement, while other portions of the first form remain static, to indicate conceptual changes involved in the transformation from the fist form to the second form of the abstract symbol statement.

2. The method of claim 1, further comprising:

d) calculating intermediate abstract representations between the first and second forms of the abstract symbol statement; and e) animating changes between the first and second forms of the abstract symbol statement by displaying said intermediate representations sequentially on said display device to cause the transformation to appear continuous.

3. The method of claim 1 wherein the abstract statement is an equation.

4. A method of teaching transformation rules for abstract symbolic statements using the method of claim 1.

5. The method of claim 1, further comprising: (d) accepting user input; and (e) changing the computer-controlled display in response to the user input.

6. A method of teaching transformation rules for abstract symbolic statements using the method of claim 5.

7. The method of claim 5, further comprising: (f) providing computer-controlled voice explanations synchronized with the animations of portions of the first form of the abstract symbol statement.

8. A method of teaching transformation rules for abstract symbolic statements using the method of claim 7.

9. The method of claim 7, further comprising (g) converting text to speech.

10. The method of claim 9, further comprising (h) controlling the synchronization of the voice and the animations of portions of the first form of the abstract symbol statement by means of a text script.

11. A method of teaching transformation rules for abstract symbolic statements by using the method of claim 10.

12. The method of claim 1 wherein the step (c) of animating portions of the first form of the abstract symbol statement includes one or more animation techniques selected from the group of animation techniques consisting of:

i) moving a symbol along a prescribed path;

ii) transforming a first symbol into a second symbol;

iii) splitting a first symbol into multiple copies;

iv) fading out a symbol;

v) fading in a symbol;

vi) adding pictorial additions to a symbol, and vii) removing a pictorial addition that was previously added to a symbol.

13. A method of teaching transformation rules for abstract symbolic statements using the method of claim 12.

14. The method of claim 12, further comprising:

d) accepting user input;

e) changing the computer-controlled display in response to the user input; and f) providing computer-controlled voice explanations synchronized with the animations.

15. A method of teaching transformation rules for abstract symbolic statements using the method of claim 14.

16. The method of claim 14, further comprising (g) evaluating context dependent content of the voice explanations.

17. A method of teaching transformation rules for abstract symbolic statements using the method of claim 16.

18. A method of teaching transformation rules for abstract symbolic statements comprising:

a) a step for displaying an abstract symbol statement in a first form;

b) a step for displaying an abstract symbol statement in a second, transformed form; and c) a step for animating a transition between the first form and the second, transformed form of the abstract statement, so as to give an illusion of motion to at least a part of one of the abstract symbol statements.

* * * * *